July 21, 1959 W. L. ARCHER ET AL 2,895,935
RESINOUS COMPOSITIONS FROM COAL ACIDS AND POLYHYDROXY
COMPOUNDS AND METHOD FOR MAKING
COMPOSITE PRODUCTS THEREOF
Filed Dec. 20, 1956

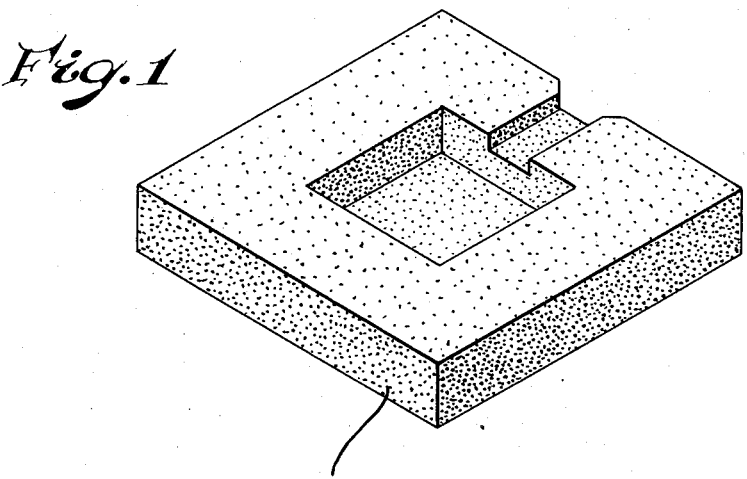

Fig. 1

Shell mold fabricated with thermoset resin binder comprised of coal acids and polyhydroxy compound.

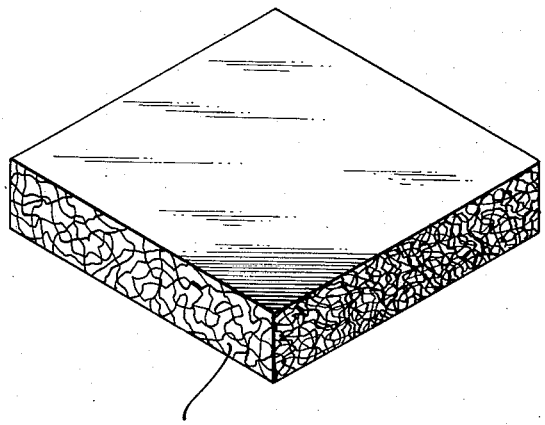

Fig. 2

Glass fiber mat bonded with thermoset resin binder comprised of coal acids and polyhydroxy compound.

INVENTORS.
Wesley L. Archer
Keith B. Bozer
Herbert B. Rickert
BY Griswold & Burdick,
ATTORNEYS

United States Patent Office 2,895,935
Patented July 21, 1959

2,895,935

RESINOUS COMPOSITIONS FROM COAL ACIDS AND POLYHYDROXY COMPOUNDS AND METHOD FOR MAKING COMPOSITE PRODUCTS THEREOF

Wesley L. Archer, Keith B. Bozer, and Herbert B. Rickert, Midland, Mich., assignors to The Dow Chemical Company, Midland, Mich., a corporation of Delaware Application December 20, 1956, Serial No. 629,668

18 Claims. (Cl. 260—37)

This invention relates to thermosetting, resin-providing compositions that are comprised of certain cross-linkable reaction products or adducts of polyfunctional polyhydroxy compounds with coal acids (or of admixtures of such reactants capable of providing such adducts) and which are capable of being cross-linked and thermally cured to resinous products having a pronounced utility for being employed in an adhesive capacity or as a binder material, or both, for any of a wide variety of inert filler substances. The invention bears especial reference to such resin-providing compositions that are exceptionally well-suited as a binder (or as a precursor thereof) for the preparation of formed composite structures with inert, siliceous filler substances such as glass fibers and sand, in particular. The invention is also concerned with the integral formed composite structures that may be prepared and obtained by thermosetting and curing the resin-providing compositions after they have been dispersed over and throughout a desired inert filler substance.

It is among the principal objects of the invention to furnish thermosetting, resin-providing compositions that are comprised of either the cross-linkable reaction products or physical admixtures of polyfunctional polyhydroxy compounds and polycarboxylic acids from the oxidation of coal and like carbonaceous materials.

It is also among the objects of the invention to furnish various thermoset resin products from such compositions as well as integral, composite structures that utilize them.

One particular object of the invention is to furnish a thermosetting resin-providing composition that is especially and advantageously adapted to function as a binder (or as a precursor thereof) for glass fibers and the like to obtain various desirable composite structures therewith including mats, panels and similar constructions.

Another particular object of the invention is to furnish a thermosetting resin-providing composition that is especially and advantageously adapted to function as a binder (or as a precursor thereof) for sand to prepare various desirable refractory structures therewith including shell molds, hot top devices and similar constructions.

A further object of the invention is to provide methods for the preparation of integral composite structures from inert filler substances, particularly siliceous fillers such as glass fibers and sand, that utilize the resin-providing compositions of the invention.

Additional objects, purposes and advantages of the invention will be manifest in the following description and specification.

According to the invention, a thermosetting, resin-providing composition is comprised of a cross-linkable composition selected from the group consisting of physical admixtures and partial reaction products or adducts of a polyfunctional polyhydroxy compound and a mixture of the polycarboxylic acids that may be obtained from the oxidation of coal and the like carbonaceous materials which, for convenience, are hereinafter referred to as coal acids. As has been indicated, the invention definitely comprehends physical admixtures of such reactant materials that can provide the cross-linking partial reaction product intermediate to the final thermoset, substantially completely cross-linked resin product. The cross-linkable coal acids adduct which, may, if desired, be obtained, is relatively thermoplastic and flowable at temperatures that are beneath suitable cross-linking and curing temperatures. Advantageously, the resin-providing compositions, whether in the form of physical mixtures or partially reacted adducts, consist of about equivalent amounts of the polyfunctional polyhydroxy compound and the polycarboxylic coal acids starting materials (taking the polyfunctionality of each of the reactant ingredients into account). This usually secures an optimum maximum potential in the resin-providing composition for cross-linking and interreaction upon being subsequently thermoset and exposed to heat at elevated curing temperatures. However, if it is desired, suitable resin-providing compositions for many purposes can also be obtained as the products of reactions between non-equivalent quantities of the polyfunctional reactants. Nonetheless, it is generally desirable for the proportions of either polyfunctional reactant that may be utilized in excess of strictly equivalent stoichiometric requirements to be maintained at less than about 2:1 equivalent parts ratio.

The cross-linkable coal acids composition may be used directly as a physical mixture of the reactants or may be prepared readily as a thermosetting, cross-linkable adduct in a suitable solvent medium, such in water, low molecular weight alcohols and the like. The reaction between the polyfunctional reactants to form an adduct generally requires the application of some heat for its accomplishment. Ordinarily, any elevated temperature beneath those that may drive off or cause water to be stripped from the reaction mass may be employed suitably to prepare the adduct. The coal acids adducts are relatively water-insoluble in comparison to the reactant ingredients which provide them. They may be isolated from the reaction mass and recovered, if so desired, as solids which have appearances that may be somewhat glassy.

Either physical admixtures of the polyfunctional reactants or the coal acids adducts (after their initial preparation) may be subjected to heat at an elevated thermosetting and curing temperature in order to provide thermoset, cross-linked, cured resinous products that are relatively glassy in appearance, completely water-insoluble, and have the indicated characteristics and utilities.

Composite structures may be prepared by mixing or compounding either a physical admixture of the resin-providing reactants or one of the solid, cross-linkable coal acids adducts with a desired inert filler substance and subsequently thermosetting the resin-providing composition after it is in intimate association with the filler. As is apparent, when a physical admixture of the reactant ingredients is compounded with the filler the initial heat that is applied to the mass serves first to form the cross-linkable, resin-providing adduct that is susceptible to being thermoset and cured to a resinous product. In many cases, however, particularly for binding glass fibers and for preparing refractory compositions with sand and equivalent inert fillers, it may be of greater advantage and a more decided benefit to prepare the composite structures by first applying or interblending a solution of the resin-providing composition (which advantageously may be a physical admixture of the reactants due to the greater insolubility of the adducts) to or with the inert filler substance and subsequently drying and heat curing the applied adduct to a cross-linked, thermoset resin structure that at least partially envelopes and binds together or coalesces the inert filler.

While requirements may vary when preparing composite structures, with individual inert filler substances and in other applications, it is usually desirable to employ a sufficient quantity of the cross-linkable composition to ensure, upon curing of the formulated composition to a composite structure, that between about 2 and 15 percent by weight of the thermoset resin, based on the weight of the formulated composition, is present in the composite structure. However, for some purposes (according to conventional practices), much more of the resin may be required. Thus, when such fillers as wood flour are utilized or when certain fiber reinforced plastic structures are being fabricated, a major proportion of the composite structure, as in the neighborhood of 50 to 70 or more percent by weight, may advantageously consist of the resin binder.

The cross-linkable coal acids compositions of the invention may be thermoset and cured at applied temperatures or in curing atmospheres having temperatures between about 300° F. and 1200° F. for periods of time between about several seconds and several hours depending, as will be appreciated by those skilled in the art, upon the particular configuration and composition that is involved. Usually (and frequently necessarily) the thermosetting or curing times that are required are inversely proportional to the temperature that is utilized. The coal acid compositions of the invention, as a general rule, can be satisfactorily thermoset and cured to suitable resin structures by heating them to an actual resin temperature between about 300° F. and 600° F. for a period of time between about 10 seconds and an hour or more, depending upon the particular heating techniques that are involved and the heat-exchanging efficiencies that are realized. Besides the more conventional means for heating, the resins may also be cured suitably under the influence of dielectric heating.

Although the resin-producing coal acid compositions of the present invention are adapted to be utilized in and of themselves in the preparation of moldings and other shaped articles, they are, as has been indicated, especially desirable for employment in or as thermosetting adhesives, binders, molding powders, fillers and the like in which capacity they may be utilized independently or in combination with other ingredients. Thus, they may be employed suitably as the adhesive ingredient in the production of ply-wood and similar laminate articles of construction. Particular benefit, as mentioned, may be derived when the resin-providing compositions are employed as binders for the preparation of composite structures from various inert filler substances including siliceous fillers, carbonaceous fillers (such as graphite, coke breeze, powdered coal and the like) and relatively analogous fillers including mineral and synthetic fibers, asbestos, fly ash, various blast furnace and powerhouse slags, mica flour, wood flour and the like fibrous or granular substances that are substantially inert to the resin-providing compositions and do not melt, fuse excessively or decompose at the thermosetting and curing temperatures which may be involved in the fabrication of the desired composite structures. Exceptional advantages are involved when such inert siliceous filler substances as glass fibers and sand are bound together with the thermoset and cured coal acids adducts of the invention. One of the halves of a shell mold prepared from a sand composition coated with a resin binder formed in accordance with the invention is illustrated in Figure 1 of the accompanying drawing. A mat of glass fibers bound together with a cured resin from a coal acid composition of the invention is depicted in Figure 2 of the drawing.

The coal acid compositions are particularly useful to form a resinous binder for glass fibers which have relatively good resistance to failure due to such spontaneous combustion phenomenon which is frequently referred to as "punking." In the utilization of the compositions to prepare binders for glass fibers, it is generally preferred to apply the composition from a relatively dilute solution (or liquid dispersion), advantageously an aqueous solution of the polyfunctional reactants, that contains between about 5 and 20 percent by weight, and more advantageously from about 6 to 12 percent by weight, based on the total weight of solution of the dissolved coal acids composition (or its reactant components). Enough of the composition should be applied to the mass of glass fibers to be bound to ensure that the desired quantity of the thermoset resin which is formed will be available for binding the fibers. A cured resin binder content between about 10 and 15 percent in the glass fibers, based on the weight of the glass by weight is oftentimes satisfactory for most glass fiber mats. When an applicating solution or other liquid dispersion (such as a suspension which may be necessary for insoluble adducts) of the resin-providing coal acids composition is applied to the glass fibers, it is beneficial to permit excess quantities of the applicating liquid to drain off before subjecting the composition to a suitable thermosetting and curing temperature. Mechanical means, such as aspirating or forced draft apparatus, may oftentimes be employed with advantage to accelerate the drainage of excess quantities of applicating liquid. The heat that is applied at the curing temperature may ordinarily be used with benefit to simultaneously remove liquid from the applied coal acids composition that is dispersed on the mass of glass fibers prior to or during its cross-linking and thermosetting at the elevated thermal condition. The curing of the applied solution to form the binding resin for the glass fibers may generally be accomplished suitably at temperatures between about 300° F. and 600° F. for periods of time between about an hour and two minutes or so. Curing at 450–550° F. for 5 to 2 minutes is oftentimes highly satisfactory. The fibrous glass composite structures such as mats, batting, panels and the like that are bound together with the thermoset and cross-linked compositions of the invention are strong, relatively rigid, moisture-resistant and have good resistance to punking.

The coal acids compositions are also extremely useful for the preparation of resin-bounded shell molds from sand and for like refractory structures. The shell molds which may be prepared with the resin-providing compositions of the invention may be fabricated in a manner similar to that which is utilized in the so-called Croning process which has been described in F.I.A.T. Final Report No. 1168 (dated May 30, 1947) by the Field Information Agency, Technical, United States Department of Commerce. Shell molds, as is well known, are finding increasing favor for employment in and to facilitate metal casting operations since they ameliorate many foundry techniques. They do not require the use of as much sand as is employed for conventional green sand mold-making operations and eliminate much of the hazard and unpleasantness due to dust and powder that obtains in the practice of the old technique. In addition, they generally permit better casings to be obtained and are lighter and less cumbersome to handle and manipulate than are conventional sand moles. The resin-providing compositions may also be utilized, as has been mentioned, in sand formulations for the fabrication of hot top devices which are utilized in the pouring of hot top ingot molds of iron and steel and for similar refractory structures.

The sand compositions for refractory structures may be formulated by thoroughly intermixing the sand with a partially reacted coal acids adduct that has been formed after it has been dried to a relatively thermoplastic and cross-linkable powder. Or, with usually greater advantage, they may be prepared by intimately intermixing a relatively strong solution, such as an aqueous solution that contains at least about 50 and preferably in the neighborhood of 70 percent or more by weight, based on the weight of the solution of a dissolved (or dispersed) cross-linkable adduct, or a mixture of its component ingredients, with the sand by continuous or batch mulling or intensive mixing procedures. In many instances it may be an advantage to first compound the dry, solid coal acids with the sand before incorporating a liquid polyfunctional polyhydroxy compound therein. The sand formulations may either be fabricated as a wet mix into desired shapes prior to being thermoset or may be dried at a non-thermosetting temperature (which possibly may form an adduct of a physical admixture of reactants) in order to form a particulate, coated sand composition that may be prepared as a dry, free-flowing granular composition into desired structures prior to being completely thermoset.

While in the process of drying a wet sand mixture in this manner (in which partially reacted adducts may be preferable to employ), it may often be beneficial to subject it to continued agitation in order to facilitate its being obtained in a suitable granular condition. It may also be beneficial to screen the dried, thermosetting coated sand formulation to obtain a desired particle size. In order to prepare shell molds in accordance with typical dump box techniques, it is usually preferred to dry the sand composition when it has been prepared by mixture with a solution of the cross-linkabe coal acids adduct and to prepare the free-flowing coated sand by any desired granulation procedure so that its average particle size characteristics are such that the preponderance of the formulation, usually at least about 70 percent by weight, is not larger than about 40 mesh in the U.S. Standard Sieve Series.

In the preparation of sand compositions for refractory structures, it is desirable to employ a sufficient quantity of the coal acids adduct (or its component ingredients) that is utilized to provide between about 2 and 15 and preferably between about 3 and 8 percent by weight of the cross-linked resin binder in the composition, based on the total weight of the composition. It is generally advantageous to utilize only as little a quantity of the resin binder in the composition for refractory structures as may be necessary in order to obtain suitably strong structures. In this way the refractory structures can be readily obtained with adequate porosity and minimized tendency to smoke and fire excessively during burn out or to cause carbonization when contacted by the molten metal that the structure is intended to receive.

The sand formulations with the coal acids compositions, when they are prepared as dry, free-flowing, coated sands, may generally be pre-formed into a desired structure, such as a shell mold, by placing them in contact while in a suitably thick layer with or against a heated pattern for a period of time from about 20 to 60 seconds with pattern temperatures between about 500 and 800° F. Wet formulations may generally be pre-formed into desired structures such as hot top devices or shell molds by compacting or compressing them against a suitable pattern or in a suitable mold form under pressures, for example, in the neighborhood of 80–120 pounds per square inch as may be developed with a hydraulic or pneumatic ram or the like. Core blowing techniques may also be employed to distribute a wet mixture against pattern surfaces or in mold forms. Regardless of whether dry or wet formulations are used the pre-formed structures may be suitably thermoset and cured by exposing them to temperatures between about 350° F. and 750° F. for periods of time between about 10 seconds and several minutes, depending again upon the particular configuration and composition that is involved in the structure being cured. The cured refractory structures that may be obtained, including shell molds and hot top devices, are, as has been indicated, generally strong and rigid products. They have high gas permeabilities due to their excellent characteristics of porosity. They have good surface smoothness and dimentional stability which permit fine detail molds and the like for metal casting purposes to be obtained. In addition, the refractory structures that may be obtained by practice of the invention produce remarkably little smoke, fumes or odor and are generally quite clean upon burn out. They also have little tendency to adhere to the surface of the hot metal after it has been cooled and solidified and may be readily stripped or removed therefrom, usually disintegrating easily and cleanly upon sharp impact or with other means for their physical removal.

The sand formulations that can be prepared with the resin-providing compositions of the invention have the significant advantage of being free from readily flammable substances and consequently safer to use, especially in the fabrication of shell molds, than are many of the phenolic resin coated sand compositions that have heretofore been used for such purposes.

Any ordinary sand (or other refractory material) that, advantageously, has a fineness in accordance with the values proposed by the American Foundryman's Society (AFS) which is in the numerical range between about 25 and 180 may be utilized for the preparation of refractory structures bound together with the thermoset, cross-link coal acids adducts (or their component ingredients) of the invention. Such sands, for example, as the types known as Berkeley Float Sand, Juniata Sand, Lake Sand, Vassar Sand, Wedron Sand, Gratiot Bank Sand, Portage 40–60 Sand and the like may be beneficially employed. It is desirable that the sand be clean and substantially free from foreign metal oxides, clay, moisture and organic matter. In many cases it may be more advantageous to employ a granular refractory material for compositions intended for shell mold fabrication that has an AFS fineness number from about 50 to 125. Very frequently, sands having an AFS fineness number in the neighborhood of 100 may be preferable for shell mold purposes. Relatively coarse sands that have an AFS fineness number between about 25 and 75 are ordinarily more desirable for utilization in formulations with the coal acids compositions of the invention that are intended for fabrication into hot top devices and the like.

The coal acids that are employed to prepare the resin-providing adducts of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been prepared by the nitric acid oxidation of suitable carbonaceous materials are also generally satisfactory. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields.

The free coal acids product is a hygroscopic, usually yellowish, essentially water-soluble material that is believed to be substantially comprised of various aromatic polycarboxylic acids. The average molecular weight of the coal acids that are ordinarily obtained is frequently in the neighborhood of 250. Their average equivalent weight is generally about 80 and seldom less than 75 or more than 90. They ordinarily appear to have an average of 2.5 to 5 carboxylic groups per molecule with an apparent average of 3 to 4 being common. While their exact chemical nature and constitution may be somewhat conjectural, they evidently contain considerable quantities of tri- and tetracarboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, naphthalene, phenanthrene, alkyl benzene, benzophenone and toluene nuclei.

The polyfunctional polyhydroxy compounds that are employed in the practice of the invention to prepare the resin-providing coal acid adducts or to provide the physical mixtures with coal acids that are capable of providing such adducts and the thermoset, cross-linked resins that may be ultimately obtained therewith may be any aliphatic or alicyclic polyhydric alcohol including the carbohydrates and related analogs. In the interests of economy, it is generally an advantage in the practice of the invention to utilize the ordinarily available polyhydroxy compounds. Polyfunctional polyhydroxy compounds that may be included in this category include ethylene and diethylene glycols, propylene and dipropylene glycols, sorbitol, mannitol, glycerol and various water-soluble alkylene oxide condensates and derivatives. While it is usually beneficial for a water-soluble polyhydroxy compound to be employed, there is no requirement to do so in order to realize a satisfactory practice of the invention.

By way of further illustration, a solution of about 31 grams (1 equivalent weight) of ethylene glycol and 82 grams (1 equivalent weight) of coal acids having an average molecular weight of about 250 in about 11 milliliters of water and blended intimately with about 4¾ pounds of AFS 33 Portage 40–60 Sand. The resulting wet sand mixture, containing about 5 percent by weight of the resin-providing ingredients, were wet pressed into hot top devices which were cured for an hour in an electric oven at a temperature of about 500° F. The resulting structures had tensile strengths which ranged from 330 to 700 pounds per square inch and were found to hold molten iron with ease. They were readily strippable from the solidified metal upon cooling.

In a similar manner, excellent shell molds can be prepared using a finer core sand and drying the wet mixture before forming the molds on hot metal patterns, or pre-forming with wet-mixtures, and subsequently thermosetting to strong, rigid, good-surfaced refractory structures.

Glass fiber mats can also be bonded together in the described fashion by using a more dilute solution of the ethylene glycol/coal acids mixture for application purposes before subsequently thermosetting and curing the coal acids adduct to form the resin binder.

Excellent results may also be obtained when diethylene, tetraethylene, propylene and dipropylene glycols and glycerol and the like are reacted with coal acids in the practice of the invention.

What is claimed is:

1. Thermosetting, cross linkable composition selected from the group consisting of physical admixtures and adducts of coal acids and a polyfunctional non-aromatic polyhydroxy compound, said polyfunctional polyhydroxy compound being selected from the group consisting of organic aliphatic polyhydric alcohols, organic alicyclic polyhydric alcohols, and mixtures thereof, said coal acids being the water-soluble, mixed aromatic polycarboxylic acids of the class that are the product of the oxidation of coal, which acids have an average molecular weight of about 250, an average equivalent weight of from about 75 to about 90 and contain an average of from about 2.5 to 5 carboxylic groups per aromatic nucleus in their molecule.

2. The composition of claim 1, wherein the composition consists of about equivalent weight proportions of the coal acids and the polyfunctional non-aromatic polyhydroxy compound.

3. The composition of claim 1, wherein the polyfunctional non-aromatic polyhydroxy compound is ethylene glycol.

4. The composition of claim 1 wherein the polyfunctional non-aromatic polyhydroxy compound is propylene glycol.

5. The composition of claim 1, wherein the polyfunctional non-aromatic polyhydroxy compound is glycerol.

6. The composition of claim 1, characterized in being thermosetting when heated to a temperature between about 300 and 600° F.

7. A thermoset, cross-linked resinous product comprising a cured composition in accordance with the composition set forth in claim 1.

8. Thermosetting mass for forming integral composite structures consisting of an inert filler substance blended with a resin-producing composition selected from the group consisting of physical admixtures and adducts of coal acids and a polyfunctional non-aromatic polyhydroxy compound, said polyfunctional polyhydroxy compound being selected from the group consisting of organic aliphatic polyhydric alcohols, organic alicyclic polyhydric alcohols, and mixtures thereof, said coal acids being the water-soluble, mixed aromatic polycarboxylic acids of the class that are the product of the oxidation of coal, which acids have an average molecular weight of about 250, an average equivalent weight of from about 75 to about 90 and contain an average of from about 2.5 to 5 carboxylic groups per aromatic nucleus in their molecule.

9. The thermosetting mass of claim 8 containing a minor proportion of about 2 percent by weight, based on the weight of the mass, of the resin-producing composition blended with the inert filler substance.

10. The thermosetting mass of claim 8 containing between about 2 and 15 percent by weight, based on the weight of the mass, of the resin-producing composition blended with the inert filler substance.

11. The thermosetting mass of claim 8, wherein the inert filler is a siliceous filler substance.

12. A thermosetting mass in accordance with that set forth in claim 11, wherein the inert, siliceous filler substance is glass fibers.

13. A thermosetting mass in accordance with that set forth in claim 11, wherein the inert, siliceous filler substance is sand.

14. Method for the fabrication of thermoset, integral composite structures which comprises blending an inert filler substance with a miner proportion of about 2 percent by weight, based on the weight of the mass, of a resin-providing composition selected from the group consisting of physical admixtures and adducts of coal acids and a polyfunctional non-aromatic polyhydroxy compound, said polyfunctional polyhydroxy compound being selected from the group consisting of organic aliphatic polyhydric alcohols, organic alicyclic polyhydric alcohols, and mixtures thereof, said coal acids being the water-soluble, mixed aromatic polycarboxylic acids of the class that are the product of the oxidation of coal, which acids have an average molecular weight of about 250, an average equivalent weight of from about 75 to about 90 and contain an average of from about 2.5 to 5 carboxylic groups per aromatic nucleus in their molecule; and sequentially subjecting the blend to thermosetting and curing heats at elevated thermosetting and curing temperatures to heat said composition to an actual temperature between about 300° F. and about 600° F. until said composition is cured.

15. The method of claim 14 and including the step of forming the blended ingredients to a desired shape prior to subjecting them to said thermosetting temperature.

16. The method of claim 14, wherein the inert filler substance is blended with the resin-providing composition by mixing a liquid dispersion of the latter with the former.

17. Method for the preparation of composite glass fiber structures which comprises applying to a mass of glass fibers a liquid dispersion of a resin-providing composition selected from the group consisting of physical admixtures and adducts of coal acids and a polyfunctional non-aromatic polyhydroxy compound, said polyfunctional polyhydroxy compound being selected from the group consisting of organic aliphatic polyhydric alcohols, organic alicyclic polyhydric alcohols, and mixtures thereof, said coal acids being the water-soluble, mixed aromatic polycarboxylic acids of the class that are the product of the oxidation of coal, which acids have an average molecular weight of about 250, an average equivalent weight of from about 75 to about 90 and contain an average of from about 2.5 to 5 carboxylic groups per aromatic nucleus in their molecule; draining excess liquid from the mass of glass fibers so that between about 4 and 10 percent by weight based on the final weight of the composite structure, of the cured resin from the resin-providing composition is intimately blended throughout the mass of glass fibers; and subsequently subjecting the blended mass to thermosetting and curing heats at elevated thermosetting and curing temperatures to heat said composition applied to said glass fibers to an actual temperature between about 300° F. and about 600° F. until said composition is cured.

18. Method for the fabrication of refractory structures which compress blending sand with a resin-providing composition selected from the group consisting of physical admixtures and adducts of coal acids and polyfunctional non-aromatic polyhydroxy compound in an amount to provide between about 3 and 8 percent by weight, based on the weight of the refractory structure, of the cured resin from the resin-providing composition in the sand blend, said polyfunctional polyhydroxy compound being selected from the group consisting of organic aliphatic polyhydric alcohols, organic alicyclic polyhydric alcohols, and mixtures thereof, said coal acids being the water-soluble, mixed aromatic polycarboxylic acids of the class that are the product of the oxidation of coal, which acids have an average molecular weight of about 250, an average equivalent weight of from about 75 to about 90 and contain an average of from about 2.5 to 5 carboxylic groups per aromatic nucleus in their molecule; forming the blended sand to a desired shape; and subsequently subjecting the formed mass to thermosetting and curing heats at elevated thermosetting and curing temperatures to heat said composition blended with the sand to an actual temperature between about 300° F. and about 600° F. until said composition is cured.

References Cited in the file of this patent
UNITED STATES PATENTS
2,501,297     Wallace _____ Mar. 21, 1950